(12) United States Patent
Ju et al.

(10) Patent No.: US 9,294,688 B2
(45) Date of Patent: Mar. 22, 2016

(54) METHOD OF CORRECTING SATURATED PIXEL DATA AND METHOD OF PROCESSING IMAGE DATA USING THE SAME

(71) Applicant: Samsung Electronics Co., Ltd., Suwon-Si, Gyeonggi-Do (KR)

(72) Inventors: Hae-Jin Ju, Seongnam-si (KR); Tae-Chan Kim, Yongin-si (KR); Won-Ho Cho, Suwon-si (KR); Rae-Hong Park, Seoul (KR)

(73) Assignees: SOGANG UNIVERSITY RESEARCH FOUNDATION, Mapo-Gu (KR); SAMSUNG ELECTRONICS CO., LTD., Gyeonggi-Do (KR)

( * ) Notice: Subject to any disclaimer, the term of this patent is extended or adjusted under 35 U.S.C. 154(b) by 27 days.

(21) Appl. No.: 14/250,537

(22) Filed: Apr. 11, 2014

(65) Prior Publication Data
US 2015/0256760 A1    Sep. 10, 2015

(30) Foreign Application Priority Data

Mar. 6, 2014   (KR) .......................... 10-2014-0026508

(51) Int. Cl.
| H04N 9/68 | (2006.01) |
| H04N 9/69 | (2006.01) |
| H04N 5/243 | (2006.01) |
| H04N 9/04 | (2006.01) |

(52) U.S. Cl.
CPC ............... *H04N 5/243* (2013.01); *H04N 9/045* (2013.01)

(58) Field of Classification Search
CPC ........... H04N 9/68; H04N 9/69; H04N 5/234; H04N 5/04

USPC ................................................... 348/241, 256
See application file for complete search history.

(56) References Cited

U.S. PATENT DOCUMENTS

| 7,224,833 | B2 | 5/2007 | Johannesson et al. |
| 8,947,554 | B2* | 2/2015 | Kitajima ................... 348/223.1 |
| 2012/0038797 | A1* | 2/2012 | Jang et al. ..................... 348/241 |
| 2012/0200731 | A1 | 8/2012 | Park et al. |

FOREIGN PATENT DOCUMENTS

| JP | 2010-147786 A | 7/2010 |
| KR | 2010-0020682 A | 2/2010 |
| KR | 10-1137037 B1 | 7/2012 |

* cited by examiner

*Primary Examiner* — Tuan Ho
(74) *Attorney, Agent, or Firm* — Harness, Dickey & Pierce, PLC

(57) ABSTRACT

Methods of correcting saturated pixel data in an image sensor are provided. A method of correcting saturated pixel data in an image sensor includes determining a weight function. The weight function indicates a correlation between color values of saturated pixels and color values of neighboring pixels. The saturated pixels are among a plurality of pixels which have a color value greater than a saturation threshold value. The neighboring pixels are among the plurality of pixels that are proximate to each of the saturated pixels. The method includes determining weight values of a neighboring pixels that are proximate to a first saturated pixel using the weight function. The method includes determining a weighted average value of the color values of each of the neighboring pixels using the weight values. The method includes correcting the color value of the first saturated pixel to the weighted average value.

19 Claims, 10 Drawing Sheets

FIG. 4

|    | C1 | C2 | C3 | C4 | C5 | C6 | C7 | C8 | C9 | C10 | C11 | C12 |
|----|----|----|----|----|----|----|----|----|----|-----|-----|-----|
| r1 | U  | U  | U  | U  | U  | U  | U  | U  | U  | U   | U   | U   |
| r2 | U  | U  | U  | U  | U  | U  | U  | U  | U  | U   | U   | U   |
| r3 | U  | U  | U  | U  | S  | S  | S  | S  | S  | U   | U   | U   |
| r4 | U  | U  | U  | S  | S  | S  | S  | S  | S  | S   | U   | U   |
| r5 | U  | U  | U  | U  | S  | S  | S  | S  | S  | S   | U   | U   |
| r6 | U  | U  | U  | S  | S  | S  | S  | S  | U  | U   | U   | U   |
| r7 | U  | U  | U  | S  | S  | S  | S  | S  | U  | U   | U   | U   |
| r8 | U  | U  | U  | U  | U  | U  | U  | U  | U  | U   | U   | U   |
| r9 | U  | U  | U  | U  | U  | U  | U  | U  | U  | U   | U   | U   |

U: UNSATURATED    S: SATURATED

FIG. 5

|    | C1 | C2 | C3 | C4 | C5 | C6 | C7 | C8 | C9 | C10 | C11 | C12 |
|----|----|----|----|----|----|----|----|----|----|-----|-----|-----|
| r1 | U  | U  | U  | U  | U  | U  | U  | U  | U  | U   | U   | U   |
| r2 | U  | U  | U  | U  | U  | U  | U  | U  | U  | U   | U   | U   |
| r3 | U  | U  | U  | U  | S  | S  | S  | S  | S  | U   | U   | U   |
| r4 | U  | U  | U  | S  | S  | S  | S  | S  | S  | U   | U   | U   |
| r5 | U  | U  | U  | U  | S  | S  | S  | S  | S  | U   | U   | U   |
| r6 | U  | U  | U  | S  | S  | S  | S  | S  | U  | U   | U   | U   |
| r7 | U  | U  | U  | S  | S  | S  | S  | S  | U  | U   | U   | U   |
| r8 | U  | U  | U  | U  | U  | U  | U  | U  | U  | U   | U   | U   |
| r9 | U  | U  | U  | U  | U  | U  | U  | U  | U  | U   | U   | U   |

U: UNSATURATED    S: SATURATED

FIG. 6

|    | C1 | C2 | C3 | C4 | C5 | C6 | C7 | C8 | C9 | C10 | C11 | C12 |
|----|----|----|----|----|----|----|----|----|----|-----|-----|-----|
| r1 | U  | U  | U  | U  | U  | U  | U  | U  | U  | U   | U   | U   |
| r2 | U  | U  | U  | U  | U  | U  | U  | U  | U  | U   | U   | U   |
| r3 | U  | U  | U  | U  | D  | D  | D  | D  | D  | U   | U   | U   |
| r4 | U  | U  | U  | D  | D  | S  | S  | S  | D  | D   | U   | U   |
| r5 | U  | U  | U  | U  | D  | S  | S  | D  | D  | D   | U   | U   |
| r6 | U  | U  | U  | D  | D  | S  | S  | D  | U  | U   | U   | U   |
| r7 | U  | U  | U  | D  | D  | D  | D  | D  | U  | U   | U   | U   |
| r8 | U  | U  | U  | U  | U  | U  | U  | U  | U  | U   | U   | U   |
| r9 | U  | U  | U  | U  | U  | U  | U  | U  | U  | U   | U   | U   |

U: UNSATURATED    D: DESATURATED    S: SATURATED

FIG. 7

|    | C1 | C2 | C3 | C4 | C5 | C6 | C7 | C8 | C9 | C10 | C11 | C12 |
|----|----|----|----|----|----|----|----|----|----|-----|-----|-----|
| r1 | U  | U  | U  | U  | U  | U  | U  | U  | U  | U   | U   | U   |
| r2 | U  | U  | U  | U  | U  | U  | U  | U  | U  | U   | U   | U   |
| r3 | U  | U  | U  | U  | D  | D  | D  | D  | D  | U   | U   | U   |
| r4 | U  | U  | U  | D  | D  | S  | S  | S  | D  | D   | U   | U   |
| r5 | U  | U  | U  | U  | D  | S  | S  | D  | D  | D   | U   | U   |
| r6 | U  | U  | U  | D  | D  | S  | S  | D  | U  | U   | U   | U   |
| r7 | U  | U  | U  | S  | S  | S  | S  | S  | U  | U   | U   | U   |
| r8 | U  | U  | U  | U  | U  | U  | U  | U  | U  | U   | U   | U   |
| r9 | U  | U  | U  | U  | U  | U  | U  | U  | U  | U   | U   | U   |

U: UNSATURATED    D: DESATURATED    S: SATURATED

| SAMPLE PICTURE | PSNR(dB) | | |
|---|---|---|---|
| | CASE1 | CASE2 | CASE3 |
| PIC1 | 34.34 | 39.71 | 54.81 |
| PIC2 | 33.62 | 37.07 | 49.52 |
| PIC3 | 25.22 | 32.51 | 49.96 |
| PIC4 | 28.41 | 33.16 | 49.02 |
| PIC5 | 35.07 | 41.74 | 54.95 |
| PIC6 | 32.40 | 36.76 | 50.72 |
| PIC7 | 29.63 | 34.85 | 50.49 |

METHOD OF CORRECTING SATURATED PIXEL DATA AND METHOD OF PROCESSING IMAGE DATA USING THE SAME

CROSS-REFERENCE TO RELATED APPLICATION

This U.S. Non-provisional application claims priority under 35 USC §119 to Korean Patent Application No. 10-2014-0026508, filed on Mar. 6, 2014, in the Korean Intellectual Property Office (KIPO), the disclosure of which is incorporated by reference in its entirety herein.

BACKGROUND

1. Technical Field

Example embodiments relate generally to data processing, and more particularly to methods of correcting saturated pixel data and methods of processing image data.

2. Discussion of the Related Art

If an image sensor has a narrow dynamic range, the color digital image of an abject, which is captured by the image sensor, may not represent the real color of the object. When incident light is very bright, the original color of the object may not be represented exactly in the captured picture. If the light intensity of a particular color exceeds a maximum color value that can be sensed by each pixel, the color value of the pixel is "clipped" to the maximum color value. Also, neighboring pixels may be affected by the clipped pixel, and the neighboring pixels may lose their original color to have the color value near the maximum color value. The pixel having the maximum color value or the color value near the maximum color value may be referred to as a "saturated pixel". The saturated pixel data, that is, the distorted color values of the saturated pixels are required to be corrected to restore the original color value.

SUMMARY

At least one example embodiment relates to a method of correcting saturated pixel data.

According to example embodiments, a method of correcting saturated pixel data in an image sensor is provided. The method includes determining a weight function. The weight function indicates a correlation between color values of saturated pixels and color values of neighboring pixels. The saturated pixels are among a plurality of pixels which have a color value greater than a saturation threshold value. The neighboring pixels are among the plurality of pixels that are proximate to each of the saturated pixels. The method includes determining weight values of a neighboring pixels that are proximate to a first saturated pixel using the weight function. The method includes determining a weighted average value of the color values of each of the neighboring pixels using the weight values. The method includes correcting the color value of the first saturated pixel to the weighted average value.

Example embodiments provide that the weight value of each of the neighboring pixels may increase as a difference between the color values of the first saturated pixel and the color values of the neighboring pixel decreases.

Example embodiments provide that the weight value of each of the neighboring pixels may increase as a difference between hue values of the first saturated pixel and the hue values of the neighboring pixel decreases.

Example embodiments provide that the weight value of the neighboring pixel may increase as a saturation value of each of the neighboring pixel decreases.

Example embodiments provide that the color values may include a red value, a green value and a blue value, and a pixel may be determined as a saturated pixel if at least one of the red value, the green value and the blue value of the pixel is greater than a saturation threshold value.

Example embodiments provide that the color values for each of the saturated pixels and the color values for each of the neighboring pixels include a red value, a green value, and a blue value, and the method further includes, determining that one of the plurality of pixels is a saturated pixel if at least one of the red value, the green value, and the blue value of the pixel is greater than the saturation threshold value.

Example embodiments provide that a second saturated pixel among the neighboring pixels may be excluded in calculating the weighted average value when the color value of the second saturated pixel is not corrected. Example embodiments also provide that a third saturated pixel among the neighboring pixels may be included in calculating the weighted average value when the color value of the third saturated pixel is corrected and/or reduced.

Example embodiments provide that the weight function may be a product of a color weight function, a hue weight function and a saturation weight function. The color weight function may indicate a difference between the color values of each of the saturated pixels and the color values for each of the neighboring pixels. The hue weight function may indicate a difference between hue values of each of the saturated pixels and hue values for each of the neighboring pixels. The saturation weight function may indicate a saturation value of each of the neighboring pixels.

Example embodiments provide that the color weight function may be determined as following equation, $$Wc(x+i, y+j) = \begin{cases} e^{-Kc[C(x,y)-C(x+i,y+j)]^2}, & \text{if } C(x+i, y+j) \leq T_{sat} \\ e^{-Kc[C(x,y)-C'(x+i,y+j)]^2}, & \text{if } C(x+i, y+j) > T_{sat} \text{ and} \\ & \text{if } C'(x+i, y+j) < C(x+i, y+j) \\ 0, & \text{otherwise} \end{cases}$$

where (x, y) is a coordinate of each of the saturated pixels, (x+i, y+j) is a coordinate of each of the neighboring pixels, Wc is the color weight function, C(x, y) is the color value that is not corrected for each of the saturated pixels, C(x+i, y+j) is the color value that is not corrected for each of the neighboring pixels, C'(x+i, y+j) is the color value that is corrected for each of the neighboring pixels, Tsat is a saturation threshold value, and Kc is a normalization constant of the color weight function.

Example embodiments provide that the hue weight function may be determined as following equations, $$Wh(x+i, y+j) = 1 - |H(x, y) - H(x+i, y+j)|,$$

$$H = \begin{cases} \dfrac{\theta}{360}, & \text{if } B \leq G \\ \dfrac{360-\theta}{360}, & \text{if } B > G \end{cases}, \text{ and}$$

$$\theta = \cos^{-1}\left\{ \frac{\frac{1}{2}[(R-G)+(R-B)]}{\sqrt{(R-G)^2+(R-B)(G-B)}} \right\},$$

where (x, y) is a coordinate of each of the saturated pixels, (x+i, y+j) is a coordinate of each of the neighboring pixels, Wh is the hue weight function, H is a hue value in a HSI color space, and R, G, and B are red, green, and blue values in a RGB color space.

Example embodiments provide that the hue weight function may be determined as following equations, $$Wh(x+i, y+j) = e^{-Kh[H(x,y)-H(x+i,y+j)]^2},$$

$$H = \begin{cases} \frac{\theta}{360}, & \text{if } B \le G \\ \frac{360-\theta}{360}, & \text{if } B > G \end{cases}, \text{ and}$$

$$\theta = \cos^{-1}\left\{ \frac{\frac{1}{2}[(R-G)+(R-B)]}{\sqrt{(R-G)^2+(R-B)(G-B)}} \right\},$$

where (x, y) is a coordinate of each of the saturated pixels, (x+i, y+j) is a coordinate of each of the neighboring pixels, Wh is the hue weight function, H is a hue value in a HSI color space, R, G, and B are red, green, and blue values in RGB color space, and Kh is a normalization constant of the hue weight function.

Example embodiments provide that the saturation weight function may be determined as following equations, $$Ws(x+i, y+j) = S(x+i, y+j), \text{ and}$$

$$S = 1 - \frac{3}{(R+G+B)}[\min(R, G, B)]$$

where (x+i, y+j) is a coordinate of each of the neighboring pixels, Ws is the saturation weight function, S is a saturation value in a HSI color space, R, G, and B are red, green, and blue values in RGB color space, and min(R, G, B) is a minimum value of R, G, and B.

Example embodiments provide that the saturation weight function may be determined as following equations, $$Ws(x+i, y+j) = 1 - e^{-Ks \cdot S(x+i, y+j)}, \text{ and}$$

$$S = 1 - \frac{3}{(R+G+B)}[\min(R, G, B)]$$

where (x+i, y+j) is a coordinate of each of the neighboring pixels, Ws is the saturation weight function, S is a saturation value in a HSI color space, R, G, and B are red, green, and blue values in a RGB color space, min(R, G, B) is a minimum value of R, G, and B, and Ks is a normalization constant of the saturation weight function.

At least one example embodiment relates to a method of processing image data.

According to example embodiments, a method of processing image data in an image sensor is provided. The Method includes, detecting a saturation region in an image, the saturation region including a plurality of saturated pixels. The method includes determining a weight function, the weight function indicating a correlation between color values of each of the plurality of saturated pixels and color values for neighboring pixels. The neighboring pixels may be a plurality of pixels that are proximate to each of the plurality of saturated pixels The method includes sequentially correcting the color values of the each of the plurality of the saturated pixels in the saturation region using the weight function.

Example embodiments provide that the weight function may be a product of a color weight function, a hue weight function, and a saturation weight function. The color weight function may indicate a difference between the color values of each of the plurality of saturated pixels and each of the neighboring pixels, the hue weight function may indicate a difference between hue values of each of the plurality of saturated pixels and each of the neighboring pixels, and the saturation weight function may indicate a saturation value of each of the neighboring pixels.

Example embodiments provide that an order for the sequentially correcting of the color values of each of the plurality of saturated pixels is based on a proximity of each of the plurality of saturated pixels to an edge portion of the saturation region.

At least one example embodiment relates to a method of correcting saturated pixel data in an image sensor.

According to example embodiments, a method of correcting saturated pixel data in an image sensor is provided. The method includes correcting a color value of a saturated pixel based on color values corresponding to pixels that are proximate to the saturated pixel.

Example embodiments provide that the method further includes determining a weighted average value of the color values of the pixels that are proximate to the saturated pixel. The weighted average value may be determined based on a weight value for each of the pixels that are proximate to the saturated pixel. The weight value for each of the pixels that are proximate to the saturated pixel may be determined using a weight function. The weight function may indicate a correlation between the color value of the saturated pixel and the color values of the plurality of pixels which are proximate to the saturated pixel.

Example embodiments provide that the saturated pixel is identified by determining a pixel from among a plurality of pixels which has a color value greater than a saturation threshold value.

Example embodiments provide that another saturated pixel from among the plurality of pixels is excluded in determining the weighted average value when the color value of the other saturated pixel is not corrected, and the other saturated pixel is included in determining the weighted average value when the color value of the other saturated pixel is corrected.

BRIEF DESCRIPTION OF THE DRAWINGS

Example embodiments will be more clearly understood from the following detailed description taken in conjunction with the accompanying drawings.

FIGS. 4, 5, 6 and 7 are diagrams for describing a method of processing image data according to example embodiments.

DETAILED DESCRIPTION OF THE EMBODIMENTS

Figure 1:
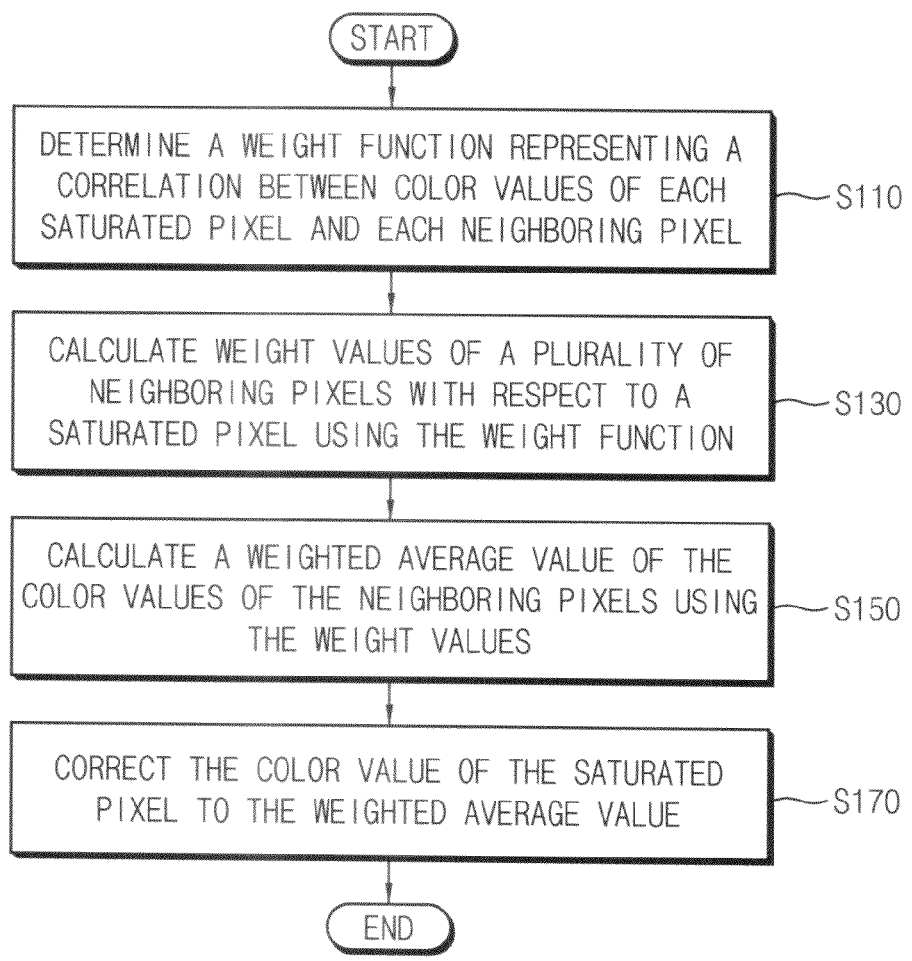
FIG. 1 is a flow chart illustrating a method of correcting saturated pixel data according to an example embodiment.

Various example embodiments will be described more fully hereinafter with reference to the accompanying drawings, in which some example embodiments are shown. The example embodiments may, however, be embodied in many different forms and should not be construed as limited to the example embodiments set forth herein. Rather, these example embodiments are provided so that this disclosure will be thorough and complete, and will fully convey the scope of the example embodiments to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of correcting saturated pixel data according to an example embodiment. It should be noted that the method of correcting saturated pixel data may be operated by a hardware computing device configured to process image signals, such as the image signal processor 400 as described with respect to FIGS. 2 and 3.

Referring to FIG. 1, as shown in operation S110, a weight function representing a correlation between color values of each saturated pixel and each neighboring pixel is determined. As shown in operation S130, weight values of a plurality of neighboring pixels with respect to a saturated pixel are calculated using the weight function. The neighboring pixels are pixels that are proximate to the saturated pixels. As shown in operation S150, a weighted average value of the color values of the neighboring pixels is calculated using the weight values. As shown in operation S170, the color value of the saturated pixel is corrected to the weighted average value. As described below, the weight function may be represented as a product of a color weight function, a hue weight function and a saturation weight function. Using the weight function reflecting the correlation between different color channels, natural color restoration may be achieved through relatively simple operations without further processing.

Figure 2:
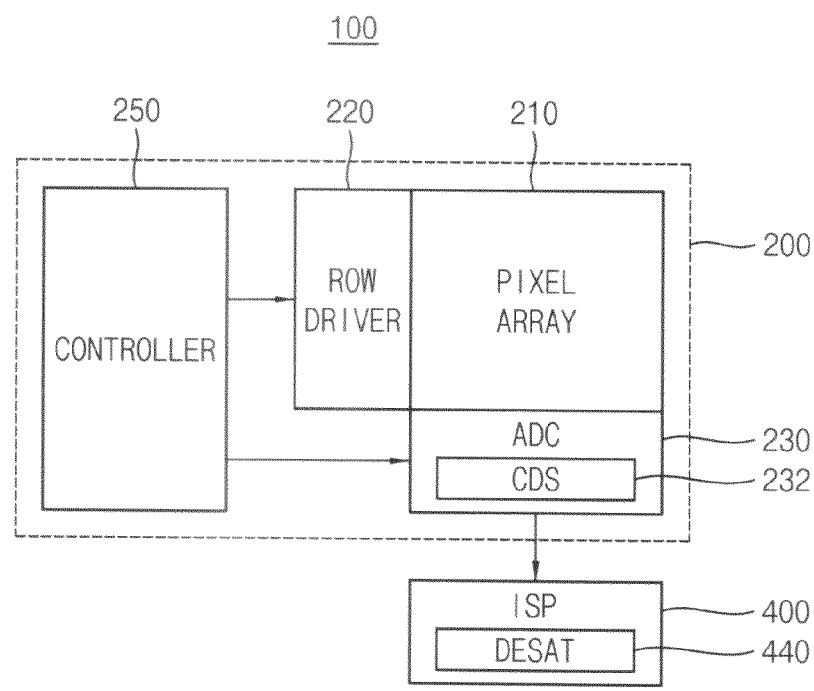
FIG. 2 is a block diagram illustrating a sensor system according to an example embodiment.

FIG. 2 is a block diagram illustrating a sensor system according to example embodiments.

Referring to FIG. 2, a sensor system 100 includes an image sensor 200 and an image signal processor (ISP) 400. The image sensor may include a pixel array 210, a row driver 220, an analog-to-digital converter (ADC) block 230 and a controller 250. The image sensor 200 and the image processor 400 may be integrated in one chip or in multiple chips.

The pixel array 210 generates analog pixel signals based on incident light. The pixel array 210 may include a plurality of unit pixels arranged in a matrix form of rows and columns. The unit pixels may have an arrangement pattern for sensing color images. For example, the unit pixels may be monochrome pixels of sensing visible light, and each pixel of the plurality of pixels may be coupled to one of red (R), green (G), and blue (B) filters. Typical, complementary metal-oxide semiconductor (CMOS) image sensors and charge-coupled device (CCD) image sensors have R, G and B filters of a predetermined arrangement pattern. For example, the R, G and B filters may be arranged in a Bayer pattern including 25% R filters, 50% G filters, and 25% B filters to reflect human visual properties. In case of the Bayer pattern, the image sensor 200 may provide RGB Bayer image data such that each pixel has one of R, G and B color values. In some embodiments, the plurality of pixels may have an arrangement pattern for sensing color images using a cyan (C), magenta (M), and yellow (Y) filters and/or other like arrangement pattern for sensing color images.

The row driver 220 is coupled to row lines of the pixel array 210 and generates signals for driving the row lines. The row driver 220 may select the unit pixels in the pixel array 210 row by row by driving one row line at each time.

The ADC block 230 is coupled to column lines of the pixel array 210 to convert analog signals on the column lines to digital signals. In example embodiments, the ADC block 230 may include a plurality of converters. Each of the plurality of converters may be coupled to a corresponding column line to perform column analog-to-digital conversion. That is, parallel conversion of the analog signals may simultaneously output through the column lines. In other example embodiments, The ADC block 230 may include one common converter for performing single column analog-to-digital conversion. That is, sequential conversion of the analog signals on the column signals.

The ADC block 230 may include a correlated double sampling (CDS) unit 232 for extracting effective signal component. For example, the CDS unit 232 may perform an analog double sampling (ADS) by obtaining the difference between the reset component and the measured signal component using capacitors and switches to output analog signals corresponding to the effective signal components. According to example embodiments, the CDS unit 232 may perform a digital double sampling (DDS) such that the analog signals corresponding to the reset component and the measured signal component are converted into the digital signals, respectively, and the effective signal component is extracted by obtaining the difference between the two digital signals. The CDS unit 232 may be configured to perform both of analog double sampling and digital double sampling.

The controller 250 may control the row driver 220 and the ADC block 230. The controller 250 may provide control signals such as a clock signal, a timing signal, and/or other like control signals required for the operations of the row driver 220 and the ADC block 230. For example, the controller 250 may include a logic control circuit, a phase-locked loop (PLL) circuit, a timing control circuit, a communication interface circuit, and/or other like control circuits.

The image signal processor 400 may receive the digital signals from the image sensor 200 and perform data processing with respect to the received digital signals. For example, the image signal processor 400 may perform image interpolation, color correction, white balance, gamma correction, color conversion, and/or other like signal processing operations. Particularly the image signal processor 400 may include a desaturator (DESAT) 440 configured to perform correction of saturated pixel data according to example embodiments.

Figure 3:
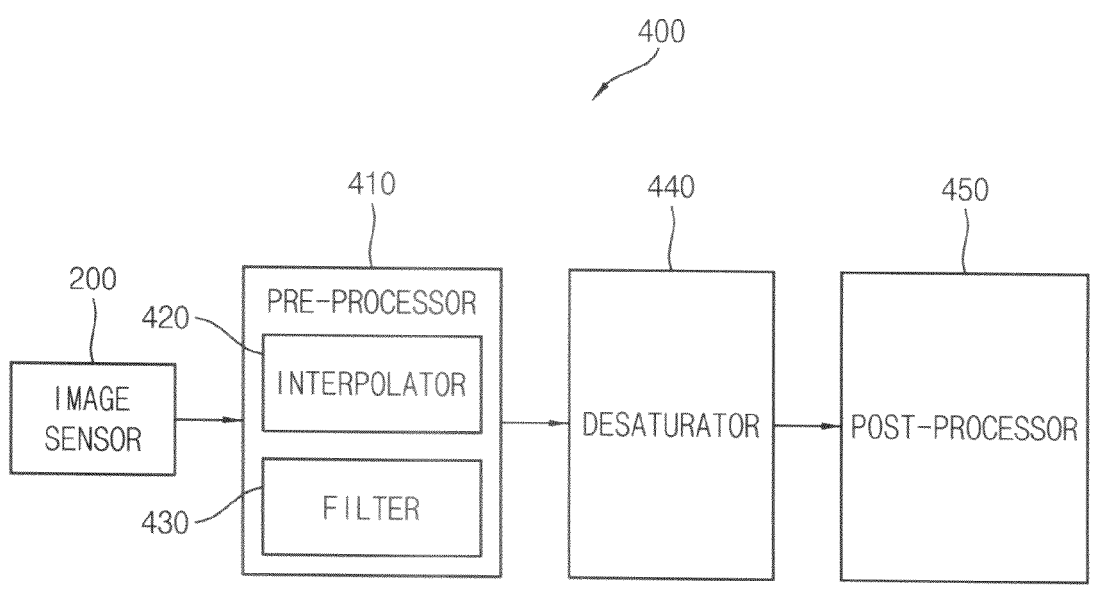
FIG. 3 is a block diagram illustrating an image signal processor according to an example embodiment.

FIG. 3 is a block diagram illustrating an image signal processor according to an example embodiment.

Referring to FIG. 3, the image signal processor 400 may include a pre-processor 410, a desaturator 440 and a post-processor 450. The pre-processor 410 may include an interpolator 420 and a filter 430.

The interpolator 420 may perform an interpolating operation of converting RGB Bayer image data from the image sensor 200 to RGB full color image data. The RGB Bayer image data are represented by a data format that each pixel has one of the R, G and B color values, and the RGB full color image data are represented by a data format that each pixel has all of the R, G and B color values. The interpolator 420 may perform pixel doubling interpolation, bilinear interpolation, and the like, based on the RGB Bayer image data to provide the RGB full color image data. In other embodiments, the interpolator 420 may perform an interpolating operation of converting CMY image data from the image sensor 200 to CMY full color image data, and perform pixel doubling interpolation, bilinear interpolation, and the like, based on the CMY image data to provide the CMY full color image data.

The filter 430 may perform a filtering operation of removing noises in the image data. For example, the filter 430 may be a bilateral filter configured to perform smoothing of the picture with conserving edges in the picture. The bilateral filter is a nonlinear filter the output of which is represented by an adaptive average. When the input picture includes noises, a low pass filter of a Gaussian function may be used to remove the noises. An intensity-based edge-stop function having intensity difference between pixels as an input may be used to calculate weight values of Gaussian filter coefficients. With respect to edge portions, where the intensity difference is large, the weight value is decreased to prevent blurring of edges. When the intensity difference is small, the weigh value is increased to remove the noises. Through such bilateral filtering, isolation regions or holes in saturation regions may be removed. The color values of the saturated pixels may be detected as being smaller than the real values because of various noises in the image sensor, interpolation of the color filter array, and the like. The bilateral filter may relieve such unreliable detection in the saturation region.

In example embodiments, the interpolation of the interpolator 420 may be performed first and then the noise filtering of the filter 430 may be performed with respect to the interpolated image data. In other example embodiments, the noise filtering may be performed first, and then the interpolation may be performed with respect to the noise-filtered image data. In still other example embodiments, the interpolation and the noise filtering may be performed simultaneously.

The desaturator 440 may receive the RGB full color image data (or alternatively, the CMY full color image data) from the pre-processor 410 and perform the correction of saturated pixel data. The desaturated image data are provided to the post-processor 450 for further processing.

The desaturator 440 may detect a saturation region of an image including a plurality of saturated pixels based on the RGB full color image data, and sequentially correct the color values of the saturated pixels in the saturation region using a weight function. The weight function is determined to represent a correlation between color values of each saturated pixel and each neighboring pixel according to example embodiments.

The saturation region in the picture may be detected using a saturation threshold value Tsat. The color values of each pixel include a red (R) value, a green (G) value and a blue (B) value, and a pixel may be determined as a saturated pixel if at least one of the R value, the G value and the B value of the pixel is greater than the saturation threshold value Tsat.

For example, in an 8-bit color image having a maximum color value of '255', the saturation threshold value Tsat may be set to '235' considering the nonlinear response of the image sensor. The pixel having at least one color value exceeding '235' may be detected as a saturated pixel. The saturation threshold value Tsat may be determined according to operational characteristics of the image sensor. When the intensive light is incident on the image sensor, the photo-electrons generated by the incident light which overflow a potential well of a pixel may cause the pixel to become saturated.

The above-mentioned bilateral filtering may be performed before detecting the saturated pixels using the saturation threshold value Tsat. After the bilateral filtering, all of the R, G and B color channels are thresholded using the saturation threshold value Tsat to detect the saturation region. The pixel having at least one of the R, G and B color values larger than the saturation threshold value Tsat may be determined as the saturated pixel.

Figure 9A:
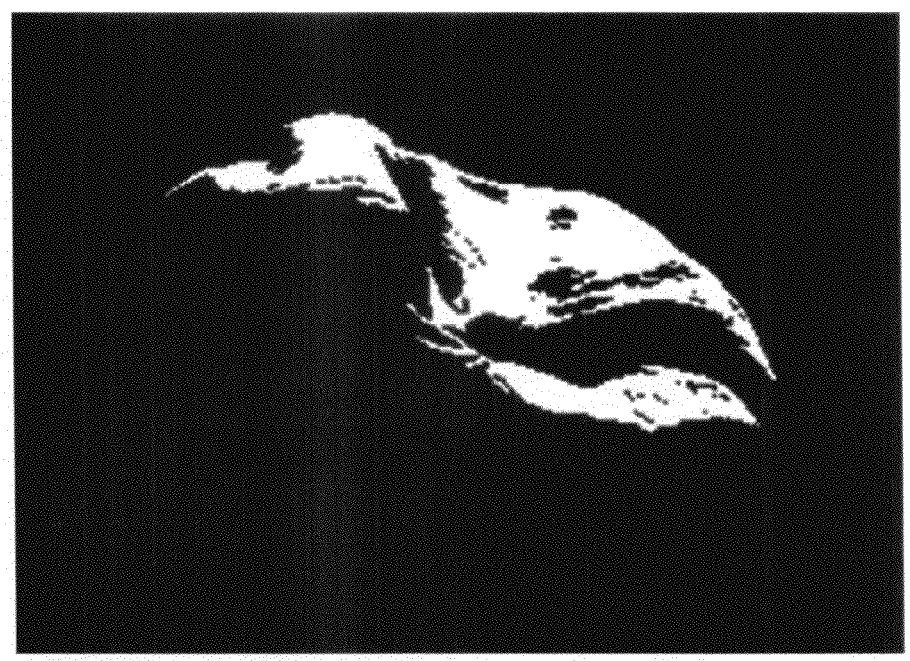
FIGS. 9A, 9B, and 9C are diagrams illustrating a method of determining a correction order of saturated pixels in the input picture of FIG. 8 according to an example embodiment.

Two or more saturation regions may be detected and the two or more saturation regions may be spaced apart from each other. The distinct saturation regions may be labeled and then processed sequentially according to the labeled order. The desaturation process may be performed independently with respect to each of the detected saturation regions having the different labels. The detection of one or more saturation regions may be performed by generating a binary image as illustrated in FIG. 9A, in which the saturated pixel has a value '1 (white)' and the unsaturated pixel has a value '0 (black)'.

According to example embodiments, the desaturator 440 corrects the color values of the saturated pixels in the saturation regions using weighted average values of the color values of neighboring pixels. The saturated pixels are corrected independently using a corresponding saturated color channel. For example, a pixel that is saturated in both of the R and G color channels, the R value of the saturated pixel is corrected with the weighted average value of the R values of the neighboring pixels, and independently the G value of the saturated pixel is corrected with the weighted average value of the G values of the neighboring pixels. The correction of each color channel may be performed as Equation 1.

$$C'(x, y) = \frac{1}{\sum_{i,j \in M} W(x+i, y+j)} \sum_{i,j \in M} W(x+i, y+j) \times C(x+i, y+j)$$

Equation 1

In Equation 1, (x, y) represent coordinates of each saturated pixel, (x+i, y+j) represent coordinates of each neighboring pixel, and W is the weight function. C is the original color value that is not corrected, and C' is the color value that is corrected. M represents a window defining the neighboring pixels that are referenced in calculating the weighted average value. For example, the window M may include the neighboring pixels of (2k+1) rows and (2k+1) columns centered on the saturated pixel that is to be corrected. In this case, i and j may be an integer between −k and k.

C and C' in Equation 1 may be one of the R, G and B values. When the R value of the saturated pixel is larger than the saturation threshold value Tsat, the R value of the saturated pixel is corrected with the weighted average value of the R values of the neighboring pixels. When the G value of the saturated pixel is larger than the saturation threshold value Tsat, the G value of the saturated pixel is corrected with the weighted average value of the G values of the neighboring pixels. When the B value of the saturated pixel is larger than the saturation threshold value Tsat, the B value of the saturated pixel is corrected with the weighted average value of the B values of the neighboring pixels. In other embodiments that use CMY filters, when the C, M, and/or Y values of the saturated pixel is larger than the saturation threshold value Tsat, the C, M, and/or Y values of the saturated pixel is corrected with the weighted average value of the C, M, and/or Y values of the neighboring pixels.

In calculating the weighted average value or the corrected color value C' in Equation 1, the weigh function W may be represented as a product of a color weight function Wc, a hue weight function Wh and a saturation weight function Ws as Equation 2, where the color weight function Wc depends on a difference between the color values C of each saturated pixel and each neighboring pixel, the hue weight function Wh depends on a difference between hue values H of each saturated pixel and each neighboring pixel, and the saturation weight function Ws depends on a saturation value S of each neighboring pixel.

$$W(x+i, y+j) = Wc(x+i, y+j) \times Ws(x+i, y+j) \times Wh(x+i, y+j)$$

Equation 2

The color weight function Wc may be determined such that the weight value of the neighboring pixel may increase as a difference between the color values of the saturated pixel and the neighboring pixel decreases. The hue weight function Wh may be determined such that the weight value of the neighboring pixel may increase as a difference between hue values of the saturated pixel and the neighboring pixel decreases. The saturation weight function Ws may be determined such that the weight value of the neighboring pixel may increase as a saturation value of the neighboring pixel decreases.

The weight value of the neighboring pixel may have to be increased if the difference between the color values of the saturated pixel to be corrected and the neighboring pixel to be referenced. For example, the color weight function Wc may be determined using a Gaussian function depending of the color values of the saturated pixel and the neighboring pixel.

In correcting the color value of a first saturated pixel, a second saturated pixel among the neighboring pixels may be excluded in calculating the weighted average value when the color value of the second saturated pixel has not been corrected. The second saturated pixel may be excluded because color values of a saturated pixel may not be reliable to be used in correcting the color values of other pixels. Accordingly the weight value '0' may be assigned to a saturated neighboring pixel. The image map, in which the weight value '0' is assigned to the unreliable neighboring pixels that have to be excluded in the calculation and the weight value other than '0' may be assigned to the other neighboring pixels, may be referred to as a certainty map.

In contrast, a third saturated pixel among the neighboring pixels may be included in calculating the weighted average value when the color value of the third saturated pixel is corrected and/or reduced, because the color values of the third saturated pixel have been corrected toward the original color of the object. Such desaturated pixels have some reliability to be used in correcting the color values of other pixels.

As such, the color weight function Wc may be determined as Equation 3, considering the difference of the color values and the certainty map.

$$Wc(x+i, y+j) = \begin{cases} e^{-Kc[C(x,y)-C(x+i,y+j)]^2}, & \text{if } C(x+i, y+j) \le T_{sat} \\ e^{-Kc[C(x,y)-C(x+i,y+j)]^2}, & \text{if } C(x+i, y+j) > T_{sat} \text{ and} \\ & \text{if } C'(x+i, y+j) < C(x+i, y+j) \\ 0, & \text{otherwise} \end{cases}$$

Equation 3

In Equation 3, (x, y) represent coordinates of each saturated pixel, (x+i, y+j) represent coordinates of each neighboring pixel, and Wc is the color weight function. C is the color value that is not corrected, and C' is the color value that is corrected. Tsat is a saturation threshold value, and Kc is a normalization constant of the color weight function Wc.

The color weight function Wc may be defined differently depending on the conditions of Equation 3. The color weight function Wc may be defined as a Gaussian function depending on the difference between C(x, y) and C(x+i, y+j) if the color value C(x+i, y+j) of the neighboring pixel is smaller than the saturation threshold value Tsat. When the C(x+i, y+j) is greater than Tsat, the color weight function Wc may be defined as the Gaussian function depending on the difference between C(x, y) and C'(x+i, y+j) only if the correction is performed with respect to the saturated neighboring pixel (x+i, y+j) and the corrected color value C'(x+i, y+j) is smaller than the original color value C(x+i, y+j). The color value having the reduced degree of saturation may be used in correction of other saturated pixel as described above. Otherwise, the weight value '0' is assigned to the color weight function according to the certainty map.

The hue weight function Wh and the saturation weight function depending on a hue (H) value and a saturation (S) value in hue, saturation and intensity (HIS) color space may be determined according to example embodiments. The H value and the S value may be used to differentiate one color from another color. In addition to the R, G and B colors, the H value may provide distinct color representation, and thus the H value may be used to reflect color similarity between the saturated pixel and the neighboring pixel. In addition, the S value has information on wavelength blending of white light, and thus the S value in addition to the H value may be used in calculating the weight values. The H value and the S value for defining the hue weight function Wh and the saturation weight function Ws may be represented as Equations 4, 5 and 6.

$$H = \begin{cases} \dfrac{\theta}{360}, & \text{if } B \leq G \\ \dfrac{360 - \theta}{360}, & \text{if } B > G \end{cases} \quad \text{Equation 4}$$

$$\theta = \cos^{-1}\left\{\dfrac{\frac{1}{2}[(R-G)+(R-B)]}{\sqrt{(R-G)^2 + (R-B)(G-B)}}\right\} \quad \text{Equation 5}$$

$$S = 1 - \dfrac{3}{(R+G+B)}[\min(R, G, B)] \quad \text{Equation 6}$$

In Equations 4, 5, and 6, R, G and B are the color values of the corresponding pixel, and min(R, G, B) is the minimum value of R, G and B. The H value and the S value of Equations 4 and 6 are between 0 and 1, respectively. The H value of Equation 4 may be calculated using θ value of Equation 5. The θ value may be defined as two cases according to the B and G values because the reversed cosine function ($\cos^{-1}$) has a value between 0 and 180 degrees. If the H value of the neighboring pixel is significantly different from that of the saturated pixel to be corrected, the color values of the neighboring pixel may not appropriate to be used in restoring the color values of the saturated pixel. The weight value of the neighboring pixel may have to be reduced as the difference of the H values of the neighboring pixel and the saturated pixel to be corrected is increased. The larger S value of the neighboring pixel indicates the lower probability that the color values of the neighboring pixel have been distorted, because the S value is decreased as the pixel is saturated more as Equation 6. For example, the S value of Equation 6 becomes '0' when all of the R, G and B values of the neighboring pixel are '255', that is, the maximum color value. Thus the weight value of the neighboring pixel may be determined to be proportional to the S value.

In example embodiments, the hue weight function Wh and the saturation weight function Ws depending on the H value and the S value may be determined as linear function as Equations 7 and 8.

$$Wh(x+i, y+j) = 1 - |H(x,y) - H(x+i, y+j)| \quad \text{Equation 7}$$

$$Ws(x+i, y+j) = S(x+i, y+j) \quad \text{Equation 8}$$

In other example embodiments, the hue weight function Wh and the saturation weight function Ws depending on the H value and the S value may be determined as Gaussian functions as Equations 9 and 10.

$$Wh(x+i, y+j) = e^{-Kh[H(x,y) - H(x+i, y+j)]^2} \quad \text{Equation 9}$$

$$Ws(x+i, y+j) = 1 - e^{-Ks \cdot S(x+i, y+j)} \quad \text{Equation 10}$$

In Equations 9 and 10, Kh and Ks are normalization constants of the function Wh and Ws, respectively.

In Equations 7, 8, 9 and 10, the hue weight function Wh and the saturation weight function Ws have the values between '0' and '1'. The values of the hue weight function Wh and the saturation weight function Ws increase and approach the value '1' as the reliability of the neighboring pixel increases.

As such, using the weight function reflecting the correlation between different color channels, natural color restoration may be achieved through relatively simple operations without further processing. Also the reliability of the corrected color values may be increased by considering saturation degree and correction results of the neighboring pixel to select the pixels to be used in the correction.

FIGS. 4, 5, 6 and 7 are diagrams for describing a method of processing image data according to example embodiments.

FIGS. 4, 5, 6 and 7 illustrate an example pixel array of a plurality of rows r1~r9 and a plurality of columns c1~c12. U indicates unsaturated pixels, S indicates saturated pixels and D indicates desaturated or corrected pixels.

To process the image data corresponding the illustrated pixel array, a saturation region including the saturated pixels S is detected first. An example of the saturation region is illustrated in FIG. 4. As described above, a pixel having at least one of the R, G and B color values larger than the saturation threshold value Tsat may be detected as a saturated pixel. As described above, the certainty may be formed by assigning the weight value '0' to the saturated pixels S and the weight value larger than '0' to the unsaturated pixels U.

The weight function is determined to represent a correlation between the color values of each saturated pixel and each neighboring pixel, and the color values of the saturated pixels in the saturation region are corrected sequentially using the weight function. As illustrated in FIG. 5, an example window including the neighboring pixels to be referenced in correcting the saturated pixel (r3, c5). For example, the window may include the pixels of five rows and five columns centered on the saturated pixel (r3, c5). If the certainty map represented by Equation 3 is applied, among the neighboring pixels in the window, only the unsaturated pixels U are used in calculating the weighted average value and the saturated pixels S may be excluded from the calculation.

In calculating the color values of the saturated pixels S in the saturation region using Equation 1, the saturated pixel located nearer to an edge portion of the saturation region may be corrected first and the saturated pixel located farther from the edge portion may be corrected later. The desaturated pixels D in the edge portion, which are determined to be corrected first, are illustrated in FIG. 6.

An example window including the neighboring pixels to be referenced in correcting the saturated pixel (r4, c6) is illustrated in FIG. 7. For example, the window may include the pixels of five rows and the five columns centered on the saturated pixel (r4, c6). If the certainty map represented by Equation 3 is applied, among the neighboring pixels in the window, the unsaturated pixels U are used in calculating the weighted average value and the saturated pixels S may be excluded from the calculation. The desaturated pixels D are used in calculating the weighted average value if the corrected color value C'(x+i, y+j) is smaller than the original color value C(x+i, y+j) as described above. In the example illustrated by FIG. 7, in correcting the saturated pixel (r4, c6), x is 4, y is 6, and i and j have the values −2, −1, 0, 1, and 2, respectively.

Figure 8:
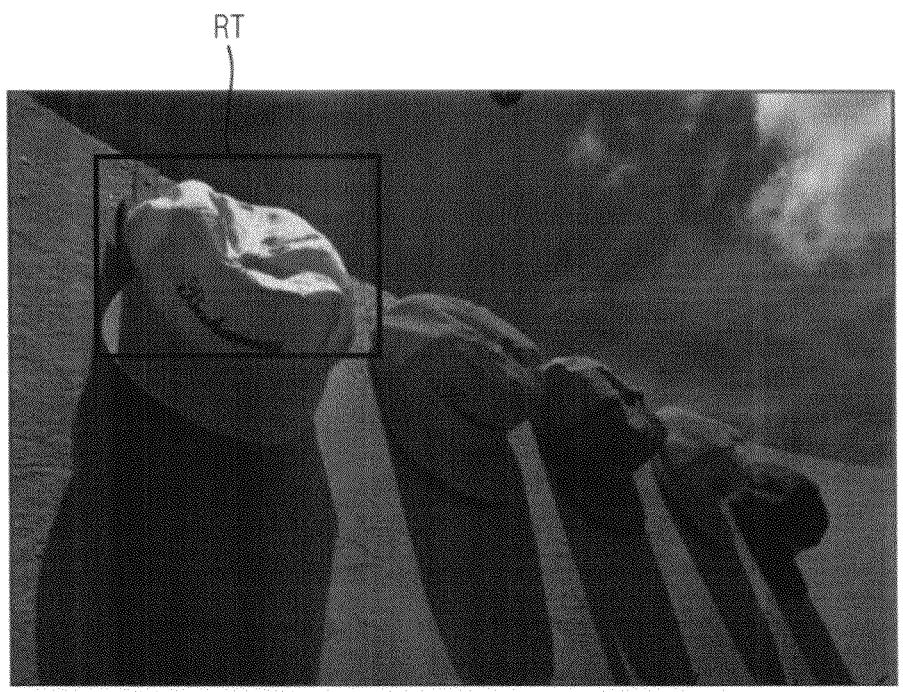
FIG. 8 is a diagram illustrating an input picture including a saturation region according to an example embodiment.

FIG. 8 is a diagram illustrating an example input picture including a saturation region according to an example embodiment, and FIGS. 9A, 9B, 9C and 9D are diagrams illustrating a method of determining a correction order of saturated pixels in the input picture of FIG. 8 according to an example embodiment.

Figure 9B:
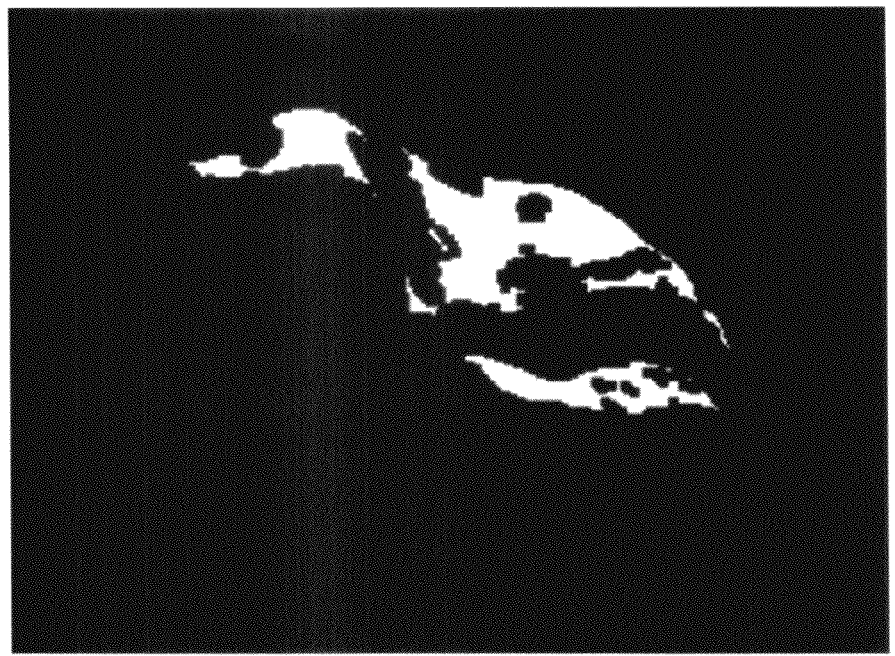
Figure 9C:
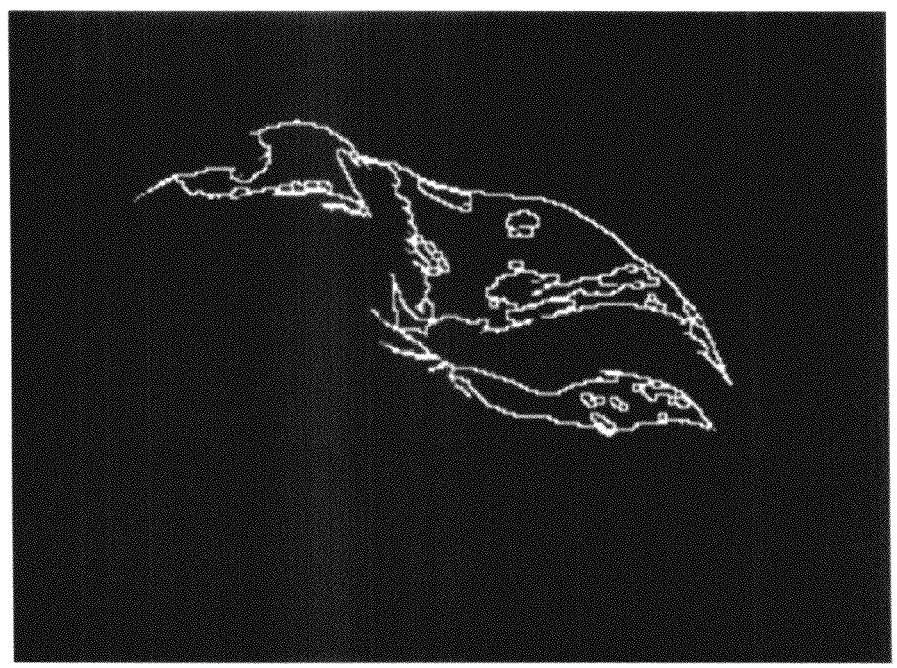

The binary images of the rectangular region RT in the input picture of FIG. 8 are illustrated in FIGS. 9A, 9B and 9C, in which the pixels of the value '0' are represented by the black color and the pixels of the value '1' are represented by the white color.

As described above, in calculating the color values of the saturated pixels S in the saturation region using Equation 1, the saturated pixel located nearer to an edge portion of the saturation region may be corrected first and the saturated pixel located farther from the edge portion may be corrected later. In determining the correction order of the saturated pixels, morphological erosion and an AND logic operation may be used. FIG. 9A illustrates a binary image in which the saturated pixels are represented by the white color corresponding to the value '1' and the unsaturated pixels are represented by the black color corresponding to the value '0'. FIG. 9B illustrates a binary image in which the edge portion of the saturation region is eroded and the values of the eroded pixels are changed from '1' to '0'. FIG. 9C illustrates a binary image in which outermost pixels to be corrected first are represented by the white color corresponding to the value '1'. The binary image of FIG. 9C may be obtained by performing the AND operation on each pixel value in FIG. 9A and corresponding pixel value in an inversed image of the binary image of FIG. 9B. With such erosion and logic operation, the saturated pixels located near the unsaturated pixels may be corrected first. When the outermost pixels in FIG. 9C are corrected, the value '0' is assigned to the desaturated pixels, and the above-described morphological erosion and AND operation are repeated to determine the correction order from the outer pixels to the center pixels. By correcting the pixels near the unsaturated pixels first, the reliability of the corrected color values may be enhanced in relation with the certainty map represented by Equation 3.

Figure 10:
FIG. 10 is a diagram illustrating an example input picture including a saturation region according to an example embodiment.
Figure 11A:
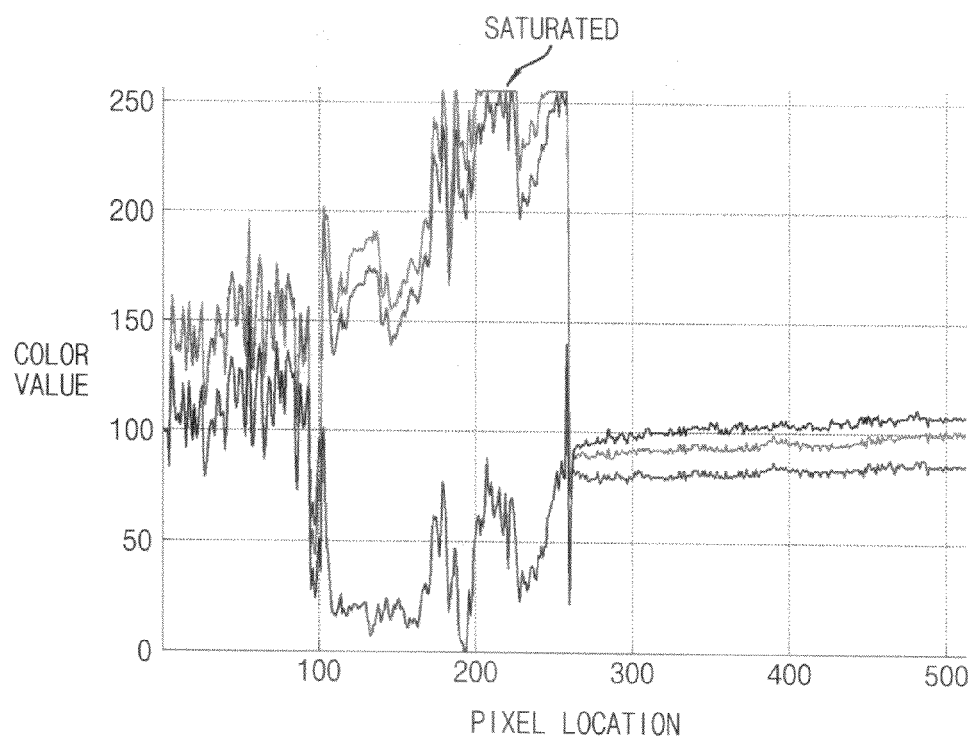
FIG. 11A is a diagram illustrating an intensity profile of the input picture of FIG. 10 according to an example embodiment.

FIG. 10 is a diagram illustrating an example input picture including a saturation region according to an example embodiment. FIG. 11A is a diagram illustrating an intensity profile of the input picture of FIG. 10 according to an example embodiment, FIG. 11B is a diagram illustrating an intensity profile of a clipped picture according to an example embodiment, and FIG. 11C is a diagram illustrating an intensity profile of a corrected picture by the method of FIG. 1 according to an example embodiment.

Figure 11B:
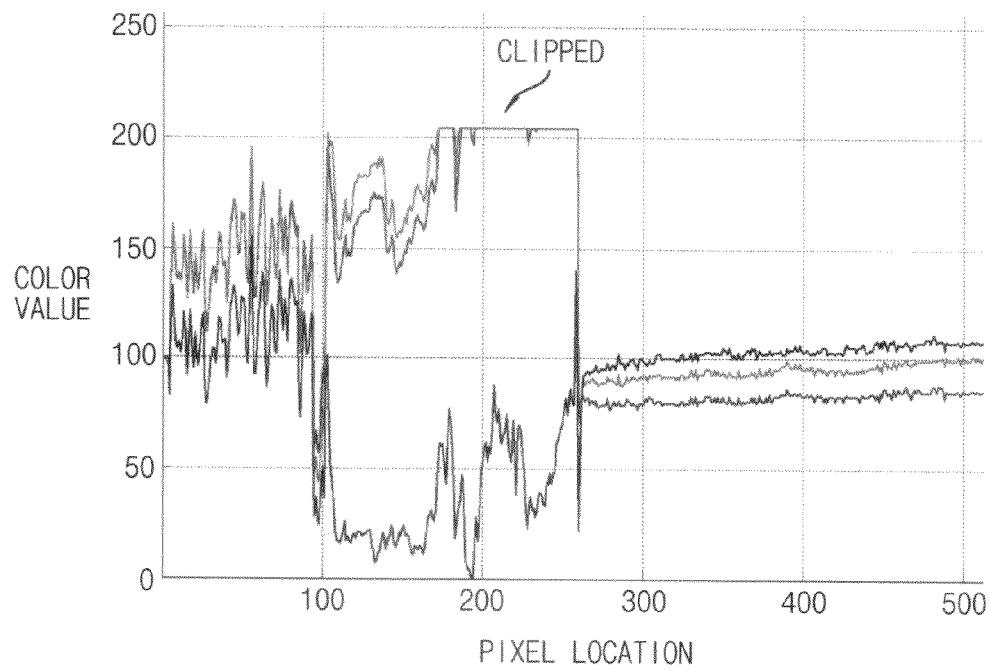
FIG. 11B is a diagram illustrating an intensity profile of a clipped picture according to an example embodiment.
Figure 11C:
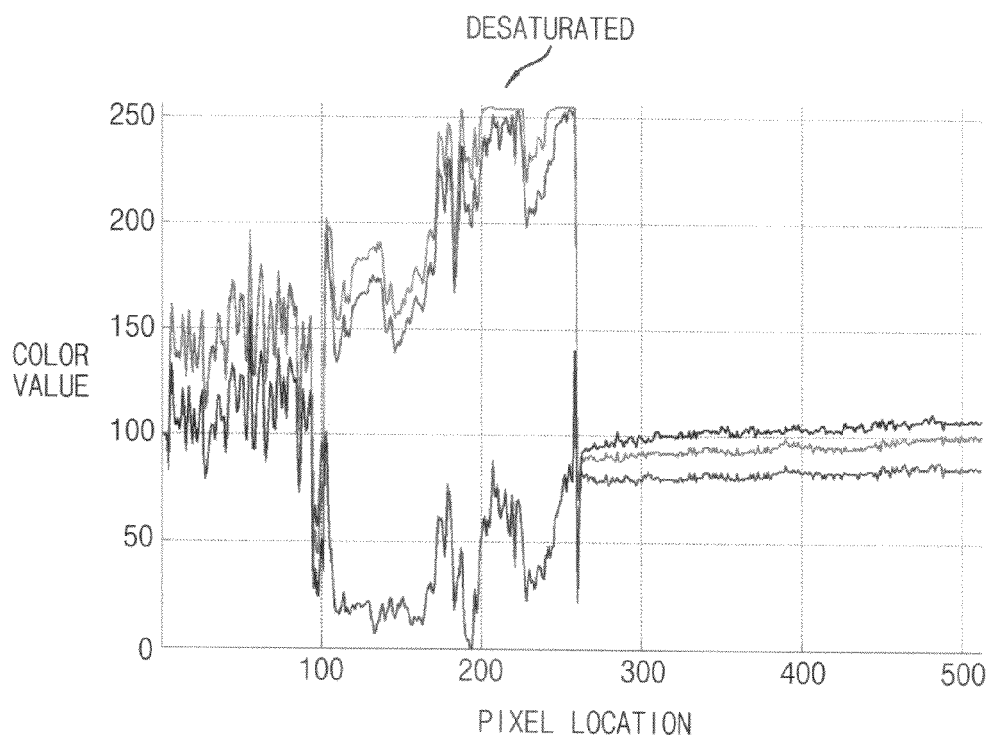
FIG. 11C is a diagram illustrating an intensity profile of a corrected picture by the method of FIG. 1 according to an example embodiment.

The input picture of FIG. 10, which may be used in analysis of intensity profile, is an 8-bit color picture, the distributions of the R, G and B color values are illustrated in each of FIGS. 11A, 11B and 11C. The vertical reference axis indicates the color value and the horizontal reference axis indicates pixel location along the horizontal line LN penetrating the saturation region in the input picture of FIG. 10.

FIG. 11B illustrates the intensity profile of the clipped picture, which may be caused by over-exposure. The picture associated with FIG. 11B is clipped by the saturation threshold value of '204' with respect to each of the R, G and B color channels. The color change in the saturated region may be grasped by comparing the intensity profiles of FIGS. 11A, 11B and 11C, Referring to FIGS. 2, 11A and 11C, the intensity profile of the desaturated or corrected portion in FIG. 11C may be restored to be very similar to that of the original input picture in FIG. 11C.

Figures 12, 13:
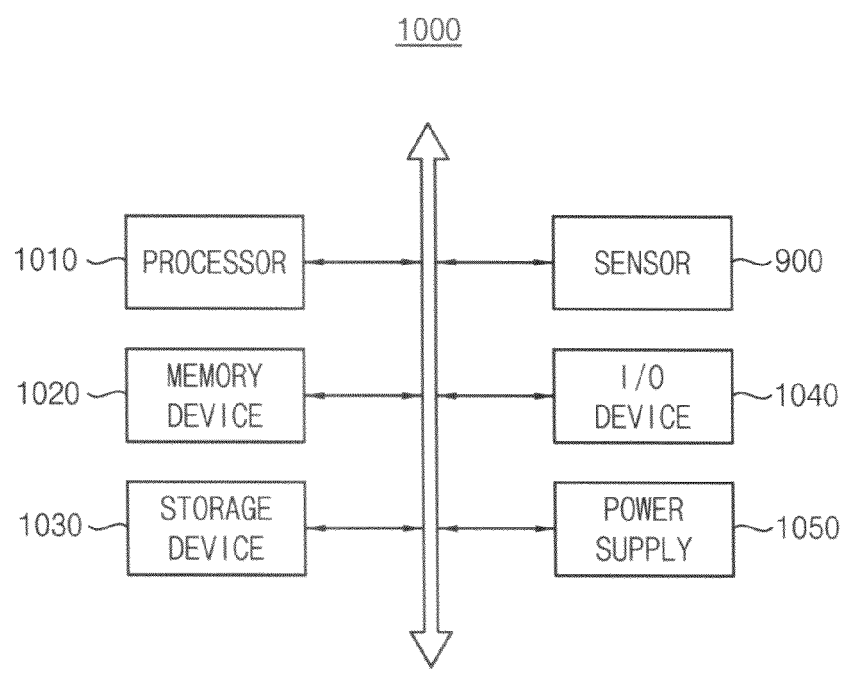
FIG. 12 is a diagram illustrating a peak signal-to-noise ratio according to processing of image data according to an example embodiment.
FIG. 13 is a block diagram illustrating a computer system according to an example embodiment.

FIG. 12 is a diagram illustrating a peak signal-to-noise ratio according to processing of image data.

The results of the quantitative estimation using various 8-bit sample pictures PIC1~PIC7 are illustrated in FIG. 12. For example, the quantitative estimation may be performed using peak signal-to-noise ratio (PSNR) as Equations 11 and 12.

$$PSNR = 10 \, \log_{10}\left(\frac{255^2}{MSE}\right) \qquad \text{Equation 11}$$

$$MSE = \frac{1}{3MN}\sum_{d=1}^{3}\sum_{j=0}^{N-1}\sum_{i=0}^{M-1}[I(i, j, d) - I'(i, j, d)]^2 \qquad \text{Equation 12}$$

In Equations 11 and 12, I is the color value of the input picture, that is, the ground truth picture and I' is the color value of each picture to be estimated in comparison with the ground truth picture. The first case CASE1 indicates the clipped pictures by over-exposure, the second case CASE2 indicates the corrected pictures according to a conventional method using convolution operations, and the third case CASE3 indicates the corrected pictures according to example embodiments. M and N indicates row and column numbers of the picture, d indicates each of the RGB color channels. According to example embodiments, the corrected picture may restore the color image close to the input picture, and the color difference between the corrected picture and the input picture may be relatively small. Compared with the second case CASE2 by conventional method, the third case CASE3 according to example embodiments yields the smaller MSE value and thus the greater PSNR value.

FIG. 13 is a block diagram illustrating a computer system according to an example embodiment.

Referring to FIG. 13, a computing system 1000 may include a processor 1010, a memory device 1020, a storage device 1030, an input/output device 1040, a power supply 1050, and an image sensor 900. Although not illustrated in FIG. 13, the computing system 1000 may further include ports that communicate with a video card, a sound card, a memory card, a universal serial bus (USB) device, and/or other electronic devices.

The processor 1010 may perform various calculations or tasks. According to some embodiments, the processor 1010 may be a microprocessor or a central processing unit (CPU). The processor 1010 may communicate with the memory device 1020, the storage device 1030, and the input/output device 1040 via an address bus, a control bus, and/or a data bus. In some example embodiments, the processor 1010 may be coupled to an extended bus, such as a peripheral component interconnection (PCI) bus. The memory device 1020 may store data for operating the computing system 1000. For example, the memory device 1020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device may include a solid state drive (SSD), a hard disk drive (HDD), a compact-disc read-only memory (CD-ROM), etc. The input/output device 1040 may include an input device (e.g., a keyboard, a keypad, a mouse, etc.) and an output device (e.g., a printer, a display device, etc.). The power supply 1050 supplies operation voltages for the computing system 1000.

The image sensor 900 may communicate with the processor 1010 via the buses or other communication links. The image sensor 900 may be integrated with the processor 1010 in one chip, or the image sensor 900 and the processor 1010 may be implemented as separate chips. According to example embodiments, the image sensor 900 may include a desaturator for performing the correction of the saturated pixel data and the associated image data process. In some example embodiments, the desaturator may be included in the processor 1010.

The computing system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), or wafer-level processed stack package (WSP).

The computing system 1000 may be any computing system configured to perform the correction of the saturated pixel data according to example embodiments. For example, the computing system 1000 may include a digital camera, a mobile phone, a smart phone, a portable multimedia player (PMP), a personal digital assistant (PDA), a wearable computing device, and/or any other like computing devices.

Figure 14:
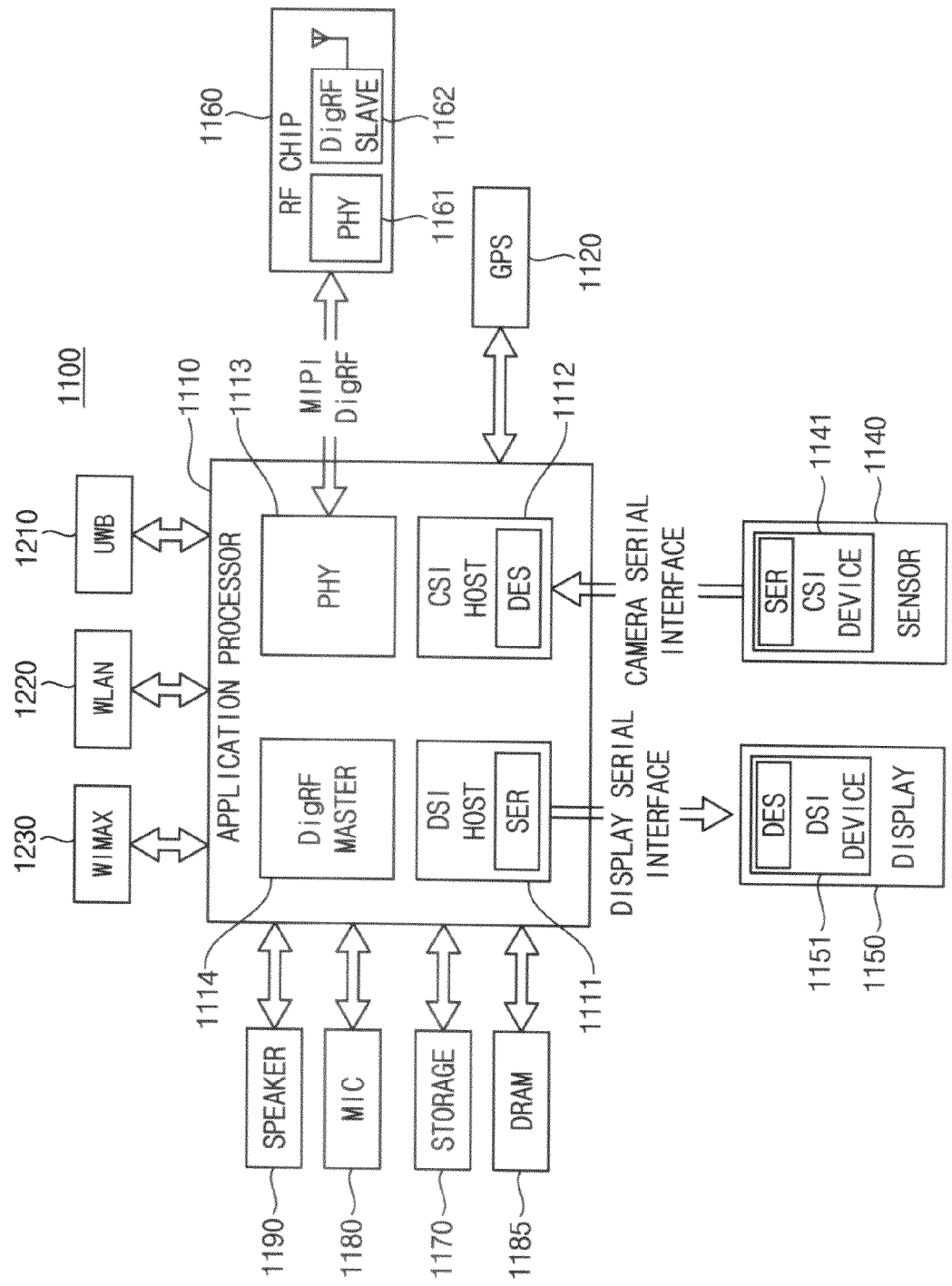
FIG. 14 is a block diagram illustrating an interface employable in the computing system of FIG. 13 according to an example embodiment.

FIG. 14 is a block diagram illustrating an interface employable in the computing system of FIG. 13 according to an example embodiment.

Referring to FIG. 14, a computing system 1100 may be implemented by a data processing device that uses or supports a mobile industry processor interface (MIPI®) interface. The computing system 1100 may include an application processor 1110, an image sensor 1140, a display device 1150, and the like. A CSI host 1112 of the application processor 1110 may perform a serial communication with a CSI device 1141 of the image sensor 1140 via a camera serial interface (CSI). In some example embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI).

A desaturator for performing the correction of the saturated pixel data and the associated image data process according to example embodiments may be included in the application processor 1110 or in the image sensor 1140.

In some example embodiments, the DSI host 1111 may include a serializer (SER), and the DSI device 1151 may include a deserializer (DES). The computing system 1100 may further include a radio frequency (RF) chip 1160 performing a communication with the application processor 1110 and a DigRFSM slave 1162 providing communication with other devices. A physical layer (PHY) 1113 of the computing system 1100 and a physical layer (PHY) 1161 of the RF chip 1160 may perform data communications based on a MIPI® DigRFSM. The application processor 1110 may further include a DigRFSM MASTER 1114 that controls the data communications of the PHY 1161.

The computing system 1100 may further include a global positioning system (GPS) 1120, a storage 1170, a MIC 1180, a DRAM device 1185, and a speaker 1190. In addition, the computing system 1100 may perform communications using an ultra-wideband (UWB) 1210, a wireless local area network (WLAN) 1220, a worldwide interoperability for microwave access (WIMAX) 1230, etc. However, the structure and the interface of the computing system 1100 are not limited thereto.

As such, by the methods of correcting saturated pixel data and processing image data according to example embodiments, natural color restoration may be achieved through relatively simple operations using the weight function reflecting correlation between different color channels, and the reliability of the corrected color values may be increased by considering saturation degree and correction results of the neighboring pixel to select the pixels to be used in the correction.

As will be appreciated by one skilled in the art, embodiments may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Some example embodiments may be applied to arbitrary devices and/or systems including an image sensor to enhance quality of image. Particularly, some example embodiments may be applied usefully to the electronic devices and/or systems such as a laptop computer, a notebook computer, a cellular phone, a smart phone), an MP3 player, a personal digital assistants (PDA), a portable multimedia player (PMP), a digital TV, a digital camera, a portable game console, and/or other like electronic devices.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of correcting saturated pixel data in an image sensor, the method comprising:

determining a weight function, the weight function indicating a correlation between color values of saturated pixels and color values of neighboring pixels, the saturated pixels being among a plurality of pixels which have a color value greater than a saturation threshold value, the neighboring pixels being among the plurality of pixels that are proximate to each of the saturated pixels;

determining, using the weight function, a weight value for each of the neighboring pixels which are proximate to a first one of the saturated pixels;

determining, using the weight value of each of the neighboring pixels, a weighted average value of the color values of the neighboring pixels; and correcting the color value of the first saturated pixel to the weighted average value.

2. The method of claim 1, wherein the weight value of each of the neighboring pixels increases as a difference between the color values of the first saturated pixel and the color values of the neighboring pixels decreases.

3. The method of claim 1, wherein the weight value of each of the neighboring pixels increases as a difference between hue values of the first saturated pixel and hue values of each of the neighboring pixels decreases.

4. The method of claim 1, wherein the weight value of each of the neighboring pixels increases as a saturation value of each of the neighboring pixels decreases.

5. The method of claim 1, wherein the color values for each of the saturated pixels and the color values for each of the neighboring pixels include a red value, a green value, and a blue value, and the method further comprises:

determining that one of the plurality of pixels is a saturated pixel if at least one of the red value, the green value, and the blue value of the pixel is greater than the saturation threshold value.

6. The method of claim 5, wherein a second saturated pixel among the neighboring pixels is excluded in determining the weighted average value when the color value of the second saturated pixel is not corrected.

7. The method of claim 5, wherein a third saturated pixel among the neighboring pixels is included in determining the weighted average value when the color value of the third saturated pixel is corrected.

8. The method of claim 1, wherein the weight function is a product of a color weight function, a hue weight function, and a saturation weight function, the color weight function indicating a difference between the color values of each of the saturated pixels and the color values of each of the neighboring pixels, the hue weight function indicating a difference between hue values of each of the saturated pixels and hue values of each of the neighboring pixels, and the saturation weight function indicating a saturation value of each of the neighboring pixels.

9. The method of claim 8, wherein the color weight function is determined as following equation, $$Wc(x+i, y+j) = \begin{cases} e^{-Kc[C(x,y)-C(x+i,y+j)]^2}, & \text{if } C(x+i, y+j) \leq T_{sat} \\ e^{-Kc[C(x,y)-C(x+i,y+j)]^2}, & \text{if } C(x+i, y+j) > T_{sat} \text{ and} \\ & \text{if } C'(x+i, y+j) < C(x+i, y+j) \\ 0, & \text{otherwise} \end{cases}$$

where (x, y) is a coordinate for each of the saturated pixels, (x+i, y+j) is a coordinate for each of the neighboring pixels, Wc is the color weight function, C(x, y) is the color value that is not corrected for each of the saturated pixels, C(x+i, y+j) is the color value that is not corrected for each of the neighboring pixels, C'(x+i, y+j) is the color value that is corrected for each of the neighboring pixels, Tsat is a saturation threshold value, and Kc is a normalization constant of the color weight function.

10. The method of claim 8, wherein the hue weight function is determined as following equations, $$Wh(x+i, y+j) = 1 - |H(x, y) - H(x+i, y+j)|,$$

$$H = \begin{cases} \dfrac{\theta}{360}, & \text{if } B \leq G \\ \dfrac{360 - \theta}{360}, & \text{if } B > G \end{cases}, \text{ and}$$

$$\theta = \cos^{-1}\left\{\dfrac{\frac{1}{2}[(R-G)+(R-B)]}{\sqrt{(R-G)^2+(R-B)(G-B)}}\right\},$$

where (x, y) is a coordinate for each of the saturated pixels, (x+i, y+j) is a coordinate for each of the neighboring pixels, Wh is the hue weight function, H is a hue value in HSI color space, and R, G, and B are red, green, and blue values in a RGB color space.

11. The method of claim 8, wherein the hue weight function is determined as following equations, $$Wh(x+i, y+j) = e^{-Kh[H(x,y)-H(x+i,y+j)]^2},$$

$$H = \begin{cases} \dfrac{\theta}{360}, & \text{if } B \leq G \\ \dfrac{360 - \theta}{360}, & \text{if } B > G \end{cases}, \text{ and}$$

$$\theta = \cos^{-1}\left\{\dfrac{\frac{1}{2}[(R-G)+(R-B)]}{\sqrt{(R-G)^2+(R-B)(G-B)}}\right\},$$

where (x, y) is a coordinate for each of the saturated pixels, (x+i, y+j) is a coordinate for each of the neighboring pixels, Wh is the hue weight function, H is a hue value in a HSI color space, R, G, and B are red, green, and blue values in a RGB color space, and Kh is a normalization constant of the hue weight function.

12. The method of claim 8, wherein the saturation weight function is determined as following equations, $$Ws(x+i, y+j) = S(x+i, y+j), \text{ and}$$

$$S = 1 - \dfrac{3}{(R+G+B)}[\min(R, G, B)]$$

where (x+i, y+j) is a coordinates for each of the neighboring pixels, Ws is the saturation weight function, S is a saturation value in a HSI color space, R, G, and B are red, green, and blue values in a RGB color space, and min(R, G, B) is a minimum value of R, G, and B.

13. The method of claim 8, wherein the saturation weight function is determined as following equations, $$Ws(x+i, y+j) = 1 - e^{-Ks \cdot S(x+i,y+j)}, \text{ and}$$

$$S = 1 - \dfrac{3}{(R+G+B)}[\min(R, G, B)]$$

where (x+i, y+j) is a coordinate for each of the neighboring pixels, Ws is the saturation weight function, S is a saturation value in a HSI color space, R, G, and B are red, green, and blue values in a RGB color space, min(R, G, B) is a minimum value of R, G, and B, and Ks is a normalization constant of the saturation weight function.

14. A method of processing image data in an image sensor, the method comprising:

detecting a saturation region in an image, the saturation region including a plurality of saturated pixels;

determining a weight function, the weight function indicating a correlation between color values of each of the plurality of saturated pixels and color values of neighboring pixels, the neighboring pixels being a plurality of pixels that are proximate to each of the plurality of saturated pixels; and sequentially correcting the color values of each of the plurality of saturated pixels in the saturation region using the weight function.

15. The method of claim 14, wherein the weight function is a product of a color weight function, a hue weight function and a saturation weight function, the color weight function indicates a difference between the color values of each of the plurality of saturated pixels and the color values of each of the neighboring pixels, the hue weight function indicates a difference between hue values of each of the plurality of saturated pixels and hue values of each of the neighboring pixels, and the saturation weight function indicates a saturation value of each of the neighboring pixels.

16. The method of claim 14, wherein an order for the sequentially correcting of the color values of each of the saturated pixels is based on a proximity of each of the plurality of saturated pixels to an edge portion of the saturation region.

17. A method of correcting saturated pixel data in an image sensor, the method comprising:

determining a weighted average value of color values of a plurality of pixels that are proximate to a saturated pixel, the weighted average value being determined based on a weight value for each of the plurality of pixels that are proximate to the saturated pixel, the weight value for each of the plurality of pixels that are proximate to the saturated pixel being determined using a weight function, the weight function indicating a correlation between the color value of the saturated pixel and the color values of the plurality of pixels which are proximate to the saturated pixel; and correcting the color value of the saturated pixel based on the color values corresponding to the plurality of pixels that are proximate to the saturated pixel.

18. The method of claim 17, wherein the saturated pixel is identified by determining a pixel from among a plurality of pixels which has a color value greater than a saturation threshold value.

19. The method of claim 17, wherein, another saturated pixel from among the plurality of pixels is excluded in determining the weighted average value when the color value of the other saturated pixel is not corrected, and the other saturated pixel is included in determining the weighted average value when the color value of the other saturated pixel is corrected.

* * * * *